United States Patent
Kwong

(10) Patent No.: US 6,486,727 B1
(45) Date of Patent: Nov. 26, 2002

(54) LOW-POWER SUBSTRATE BIAS GENERATOR DISABLED BY COMPARATORS FOR SUPPLY OVER-VOLTAGE PROTECTION AND BIAS TARGET VOLTAGE

(75) Inventor: David Kwong, Fremont, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 38 days.

(21) Appl. No.: 09/682,736

(22) Filed: Oct. 11, 2001

(51) Int. Cl.[7] ................................. H03K 3/01
(52) U.S. Cl. ..................... 327/534; 327/535; 327/537; 327/156
(58) Field of Search ................. 327/530, 534, 327/535, 536, 537, 155, 156, 157

(56) References Cited

U.S. PATENT DOCUMENTS

| | | | | |
|---|---|---|---|---|
| 4,288,865 A | * | 9/1981 | Graham | 327/535 |
| 4,322,675 A | * | 3/1982 | Lee et al. | 327/535 |
| 4,433,253 A | | 2/1984 | Zapisek | 327/536 |
| 4,794,278 A | | 12/1988 | Vajdic | 327/537 |
| 5,113,088 A | | 5/1992 | Yamamoto et al. | 327/536 |
| 5,267,201 A | | 11/1993 | Foss et al. | 365/189.09 |
| 5,307,315 A | | 4/1994 | Oowaki et al. | 365/189.09 |
| 5,347,172 A | * | 9/1994 | Cordoba et al. | 327/536 |
| 5,670,907 A | | 9/1997 | Gorecki et al. | 327/535 |
| 5,694,072 A | * | 12/1997 | Hsiao et al. | 327/537 |
| 5,835,420 A | | 11/1998 | Lee et al. | 365/189.09 |
| 5,889,719 A | | 3/1999 | Yoo et al. | 365/226 |
| 6,052,019 A | * | 4/2000 | Kwong | 327/437 |
| 6,114,876 A | * | 9/2000 | Kwong et al. | 326/81 |
| 6,137,335 A | | 10/2000 | Proebsting | 327/281 |
| 6,154,411 A | | 11/2000 | Morishita | 365/226 |
| 6,265,946 B1 | | 7/2001 | Bartlett | 331/17 |
| 6,329,869 B1 | * | 12/2001 | Matano | 327/536 |

* cited by examiner

Primary Examiner—Timothy P. Callahan
Assistant Examiner—An T. Luu
(74) Attorney, Agent, or Firm—Stuart T. Auvinen

(57) ABSTRACT

A substrate bias generator has a ring oscillator disabled when a supply over-voltage condition is detected by a supply comparator, or when a target substrate voltage is reached. A substrate comparator compares the substrate voltage to a reference generated by a p-channel sense transistor that is independent of the substrate voltage. The substrate is sensed by an n-channel sense transistor with only its bulk connected to the substrate voltage. Current sources for the sense transistors and comparator are controlled by bias voltages generated by a voltage divider that switches from a high-power state to a low-power state once the substrate target is reached. Feedback turns off a high-current resistor, limiting current to that passing through a low-current resistor. The bias voltages are adjusted to reduce current to the sense transistors and comparator, reducing power. High current and power are used for fast sensing before the substrate target is reached.

18 Claims, 5 Drawing Sheets

LOW-POWER SUBSTRATE BIAS GENERATOR DISABLED BY COMPARATORS FOR SUPPLY OVER-VOLTAGE PROTECTION AND BIAS TARGET VOLTAGE

BACKGROUND OF THE INVENTION

This invention relates to integrated circuits (ICs), and more particularly to disabling substrate bias generators.

Charge pump circuits are commonly used for generating voltages above or below supply voltages. Memory circuits often use a charge pump or substrate bias generator to generate a substrate bias Vbb that drives the p-substrate or P-wells under n-channel transistors. Using a substrate bias below ground increases the width of the depletion region under a transistor and thus reduces parasitic capacitances. Speed is thus improved.

More recently substrate bias generators have also been used to improve undershoot protection for bus-switch transistors. See Kwong, U.S. Pat. No. 6,052,019, assigned to Pericom Semiconductor Corp. of San Jose, CA.

The oscillator that pumps the charge in a substrate bias generator draws power. A voltage comparison can be performed to compare the substrate voltage to a target, and the charge pump turned off when the target is reached, saving power. See Hsiao et al. in U.S. Pat. No. 5,694,072, assigned to Pericom Semiconductor Corp. of San Jose, Calif.

To prevent pumping below the target Vbb, a clamp has been used to quickly discharge the substrate until the target is reached. See Vajdic, U.S. Pat. No. 4,794,278, assigned to Intel Corp. of Santa Clara, CA. Other devices vary the frequency of the oscillator and also detect when the power supply is too high. See Yoo et al., U.S. Pat. No. 5,889,719, assigned to Samsung Electronics Co. of Korea.

Detection of the Vcc over-voltage condition is useful, since the substrate generator pumps to a lower target when Vcc is increased. If the substrate voltage reaches the breakdown voltage of the transistors or junctions, damage to the IC may result. Vcc supply over-voltage may occur during electro-static-discharges (ESD) events, resulting in chip damage when no over-voltage protection is provided for the charge pump.

A low-power substrate-bias generator that includes Vcc supply over-voltage protection is desirable.

DETAILED DESCRIPTION

The present invention relates to an improvement in substrate bias generators. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
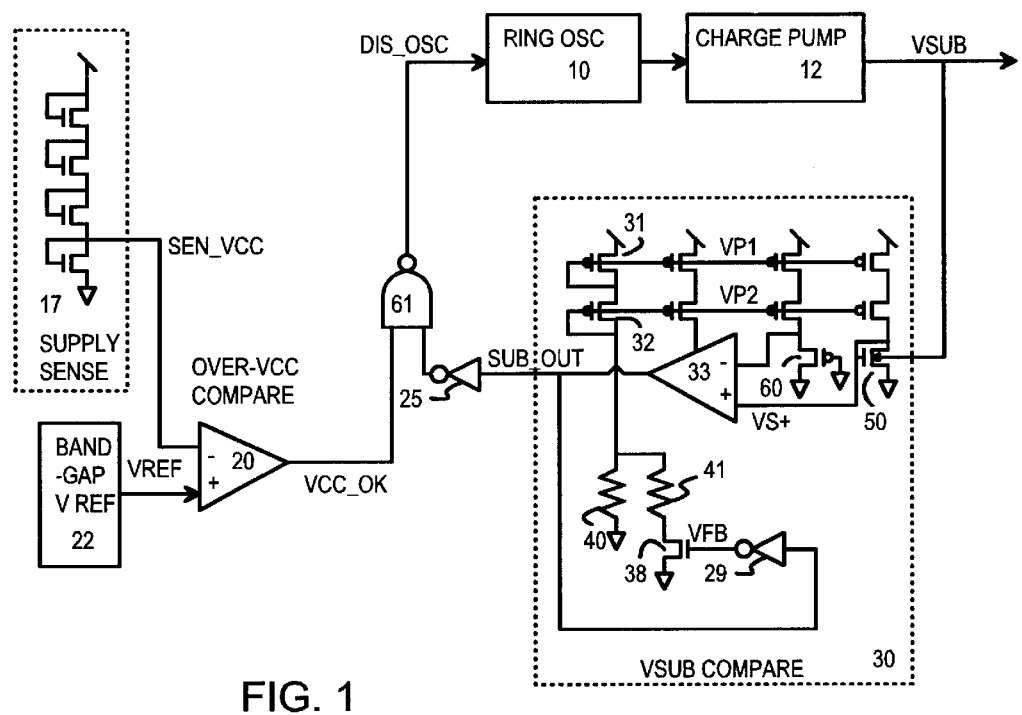
FIG. 1 is a block diagram of a low-power substrate bias generator with supply over-voltage protection.

FIG. 1 is a block diagram of a low-power substrate bias generator with supply over-voltage protection. Ring oscillator 10 is enabled when disable oscillator DIS_OSC signal is low, and power is applied to the circuit. Ring oscillator 10 drives charge pump 12, which pumps charge from the substrate node. The substrate's voltage VSUB (Vbb) is pumped below ground, providing a negative back bias to n-channel transistors in the P-wells or p-substrate connected to VSUB.

An ESD event can cause the supply voltage Vcc to rise above its normal operating range. Unusual operating conditions may also cause Vcc to rise above its normal range. This can cause damage to the chip if the substrate is pumped too far below ground.

Band-gap voltage reference 22 uses a band-gap or other supply-independent circuit to generate reference voltage VREF which does not depend on the level of the Vcc supply voltage. Supply sense 17 generates a sense voltage that depends on the supply voltage. A voltage divider network can be used to divide Vcc to generate the sense voltage. Supply comparator 20 compares the supply sense voltage from supply sense 17 to the band-gap reference voltage VREF from band-gap voltage reference 22. The supply sense voltage is applied to the inverting (−) input of supply comparator 20, while the band-gap reference voltage VREF is applied to the non-inverting (+) input.

The supply sense voltage is normally less than the band-gap reference voltage, so the output of supply comparator 20, VCC_OK, is normally high. However, when Vcc rises above its normal range, the supply sense voltage from supply sense 17 eventually crosses over and exceeds the band-gap reference voltage VREF. Then supply comparator 20 drives VCC_OK low. This low is input to NAND gate 61, driving its output, DIS_OSC high. The high DIS_OSC disables ring oscillator 10, stopping charge pump 12.

The substrate voltage VSUB is compared to a target voltage by substrate comparator 30. The substrate is connected to the bulk terminal of sense transistor 50. As VSUB is pumped more and more below ground, the source-to-bulk voltage of sense transistor 50 increases, causing the threshold voltage to increase. The larger threshold voltage decreases the current through sense transistor 50, increasing its drain and gate voltage VS+to compensate to sink a constant current from the p-channel transistors in series with sense transistor 50.

The gate and drain of sense transistor 50 are connected together and to the + input of comparator 33, node VS+. The − input to comparator 33 is the gate and drain voltage of target transistor 60. Target transistor 60 sets the target level for the substrate bias. Since a p-channel transistor is used for target transistor 60, it is not dependent on the substrate voltage VSUB.

As the substrate is pumped lower in voltage, the threshold of sense transistor 50 increases, causing voltage VS+ to rise above the target set by p-channel target transistor 60. Comparator 33 then switches its output SUB_OUT high, signaling that the substrate is outside the target level. The high SUB_OUT signal is inverted by inverter 25 and causes NAND gate 61 to drive DIS_OSC high. Ring oscillator 10 is disabled, stopping charge pump 12, which stops reducing the substrate bias voltage VSUB.

Feedback is provided in substrate comparator 30 to reduce power once the target is reached. Higher power is provided before the substrate has reached the target, when ring oscillator 10 is normally on and burning power anyway. The higher power improves sensing speed.

When SUB_OUT goes high, inverter 25 drives a low to the gate of feedback transistor 38. This cuts off the current flow through resistor 41. Instead, current from p-channel transistors 31, 32 can only flow through resistor 40. Since resistor 40 has a higher resistance value than resistor 41, current is reduced, and the drain voltages of p-channel transistors 31, 32 increase. The higher drain voltages VP1, VP2 reduce the current in comparator 33, target transistor 60, and sense transistor 50. This puts substrate comparator 30 into a lower-power state.

Figure 2:
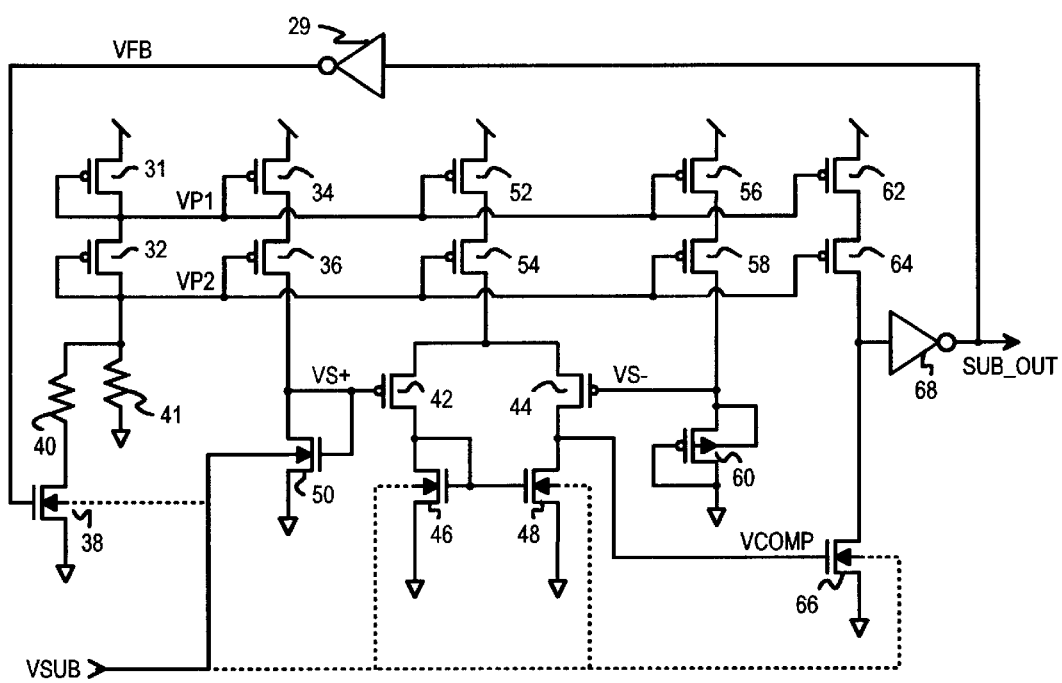
FIG. 2 is a schematic of the substrate comparator with feedback to reduce power after the target level is sensed.

FIG. 2 is a schematic of the substrate comparator with feedback to reduce power after the target level is sensed. Substrate comparator 30 receives the substrate node which is connected to the bulk terminals of all n-channel transistors. Sensing of the substrate voltage VSUB is performed by n-channel sense transistor 50. The gate and drain of sense transistor 50 are connected together as and applied to p-channel differential transistor 42 as VS+ to the non-inverting input to a differential comparator.

Current sources are provide by p-channel transistors 34, 52, 56, 62, which have a gate voltage VP1 that is generated by the gate and drain of p-channel transistor 31, which are in series with p-channel transistors 36, 54, 58, 64 which have a gate voltage VP2 that is generated by the gate and drain of p-channel transistor 32. These current sources track each other since they have common gate voltages.

A voltage divider that sets VP1, VP2 includes p-channel transistors 31, 32 in series, and resistors 40, 41 in parallel. Resistor 41 has a higher resistance than resistor 40 and thus conducts less current. Feedback transistor 38 is on when feedback voltage VFB is high, which is inverted from SUB_OUT by inverter 29. When the substrate is between ground and the target, and has not yet reached the target, SUB_OUT is low, VFB is high, n-channel feedback transistor 38 is on, and a large current is pulled through resistor 40 and p-channel transistors 31, 32. This large current is sourced by p-channel transistors 31, 32 as VP1, VP2 fall to increase the current delivered. This higher current is mirrored to the other current sources, which source higher current, providing faster sensing and comparison by substrate comparator 30. Thus when SUB_OUT is low, substrate comparator 30 is in a high-power state that provides fast sensing.

When the substrate voltage VSUB reaches the target, SUB_OUT goes high, VFB goes low, turning off n-channel feedback transistor 38. Resistor 40 no longer conducts the high current. Instead, a low current is sunk by resistor 41. This lower current is sourced by p-channel transistors 31, 32, which raise their gate and drain voltages VP1, VP2 to reduce current drive. The higher VP1, VP2 cause other p-channel transistors 34, 36, 52, 54, 56, 58, 62, 64 to also reduce current sourced to the differential comparator and sense circuits. Thus the substrate comparator 30 enters a reduced power state when SUB_OUT goes high. This is also when ring oscillator 10 is disabled, so the chip enters a low power state. Once VSUB leaks enough charge to cause VSUB to rise above the target, SUB_OUT is again driven low, causing substrate comparator 30 to enter the high-power state. Ring oscillator 10 is normally turned on too to pump the substrate back to the target.

The substrate voltage VSUB is sensed by n-channel sense transistor 50, which has its bulk node connected to VSUB. The gate and drain of sense transistor 50 are not connected to the substrate, but to the gate of differential transistor 42 as VS+. As VSUB falls toward the target during pumping, the source-to-bulk voltage increases. This increases the threshold voltage of sense transistor 50. The higher threshold voltage reduces the current drive of sense transistor 50, causing VS+ rise in voltage.

A constant target reference voltage VS− is provided by p-channel reference transistor 60. Current is sourced to reference transistor 60 by p-channel transistors 56, 58, which match the current sourced to sense transistor 50 by p-channel transistors 34, 36. The gate of p-channel reference transistor 60 is tied to ground to keep the transistor on. The source of reference transistor 60 is connected to the gate of p-channel differential transistor 44 as target voltage VS−. The bulk node of reference transistor 60 is connected to its source, VS− to minimize the body effect, but the bulk node can also be tied to Vcc. Since reference transistor 60 is a p-channel transistor, it is not connected to VSUB and is thus independent of changes to the substrate voltage. The target compared, VS−, is thus independent of VSUB.

When the substrate voltage VSUB is pumped below the target, VS+ rises above VS−. Then p-channel differential transistor 42 receiving VS+ conducts less current than p-channel differential transistor 44 receiving the constant VS−. The larger current through differential transistor 44 and n-channel current mirror transistor 48 causes VCOMP to rise. The gates of n-channel current mirror transistors 46, 48 are connected together and to the drains of transistors 42, 46. Current is sourced by p-channel transistors 52, 54 to differential transistors 42, 44.

A level shifter and inverter is formed by p-channel transistors 62, 64 and n-channel transistor 66. As VCOMP rises in voltage, n-channel transistor 66 conducts more current, causing its drain to fall in voltage. The lower drain voltage is input to inverter 68, which drives SUB_OUT high to indicate that the substrate voltage is outside the target range. The substrate pumping can then be stopped by disabling ring oscillator 10.

Figure 3:
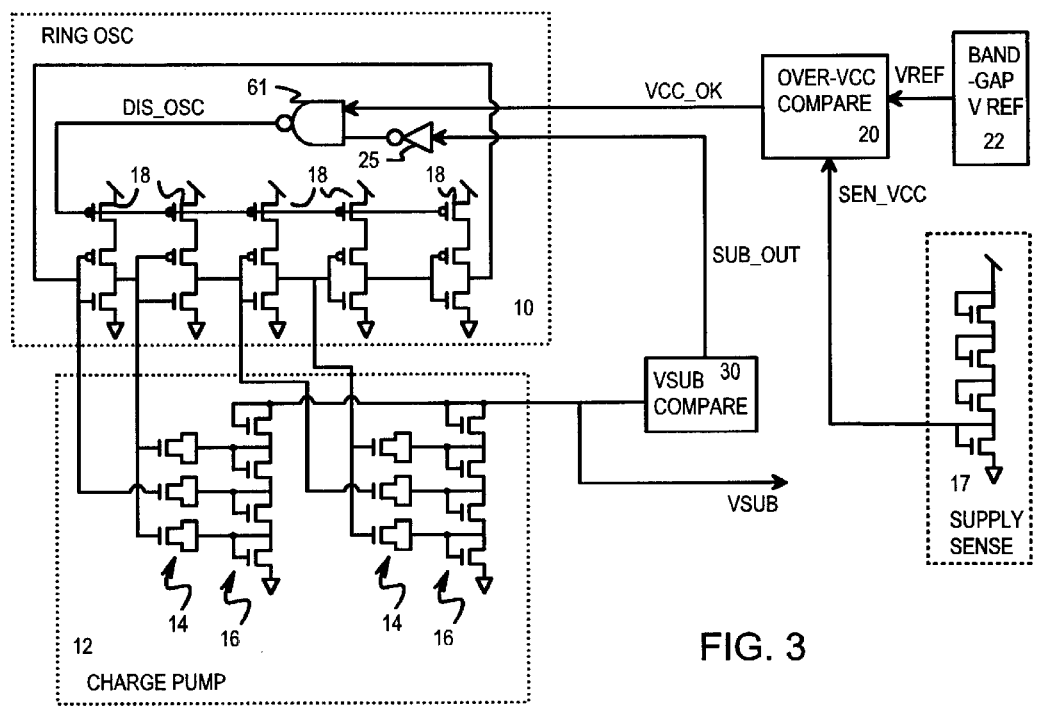
FIG. 3 is a diagram highlighting the ring oscillator and charge pump that are disabled by substrate target comparison and supply over-voltage detection.

When substrate comparator 30 enters the low power state, the voltages VS−, VS+ may change. However, the target is still determined by reference transistor 60, although at a different bias point. Some hysteresis in the target may be included to prevent turning ring oscillator 10 on and off repeatedly when VSUB is near the target. FIG. 3 is a diagram highlighting the ring oscillator and charge pump that are disabled by substrate target comparison and supply over-voltage detection. Supply comparator 20 drives VCC_OK low when SEN_VCC from supply sense 17 is above VREF from band-gap voltage reference 22. The low VCC_OK is applied to NAND gate 61, forcing its output DIS_OSC high. DIS_OSC drives the gates of p-channel current-source transistors for inverter 18 in ring oscillator 10 and turns them off. The oscillation then stops.

When the substrate bias voltage VSUB is pumped below the target, substrate comparator 30 drives SUB_OUT high. Inverter 25 inverts SUB_OUT, driving a low to NAND gate 61. NAND gate 61 then drives its output, DIS_OSC, high, disabling inverters 18. This also turns off ring oscillator 10.

When DIS_OSC is low, the p-channel current-source transistors in inverters 18 supplies current to the p-channel and n-channel transistors in each inverter 18. There are an odd number of inverters 18 in a loop in ring oscillator 10. This negative feedback causes oscillation as no steady-state exists.

Upper and lower capacitors 14 have their gates driven by the inputs to the second and fourth inverters 18, while middle capacitors 14 have their gates driven by the outputs of the first and third inverters 18. Since the first and third stage outputs are inverses of the second and fourth stage outputs, the middle capacitor 14 is pumped in the opposite direction as the upper and lower capacitors 14. This maximizes the pumping voltage swing coupled in from ring oscillator 10 to charge pump 12.

Capacitors 14 have their source and drain nodes connected to drive the gates and drains of n-channel diode-connected transistors 16. These transistors 16 conduct charge when their gates and drains are a threshold above their sources. A fraction of the full-voltage swing from inverters 18 are coupled through capacitors 14 to the gates of transistors 16. Each transistor 16 turns on when a low-going transition of inverter 18 is coupled through its capacitor 14, as its gate is pumped below ground by charge coupling across capacitor 14. Charge is drawn from the substrate and pumped up to ground. This results in a lowering of the substrate voltage VSUB to below ground.

For the 3-transistor chains shown, the substrate can nominally be pumped to 4 threshold drops below ground, or about −3 to −4 volt, taking into account the larger thresholds due to the body effect.

Figure 4:
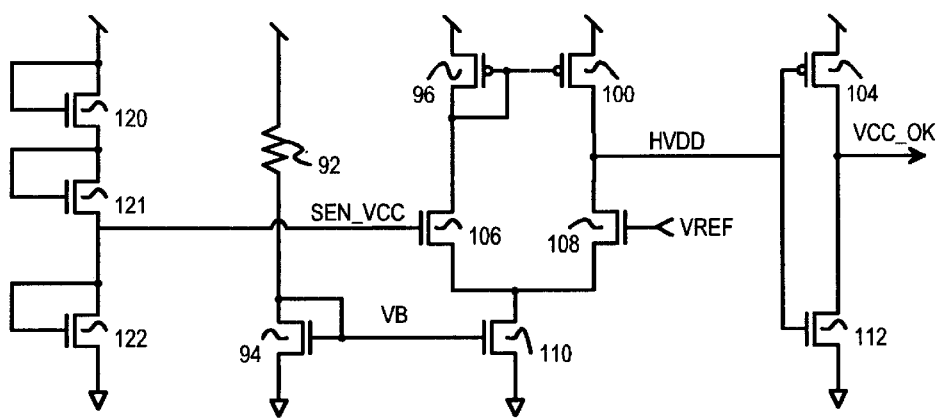
FIG. 4 is a schematic of a supply sense and comparator circuit.

FIG. 4 is a schematic of a supply sense and comparator circuit. Supply sense 17 is a voltage divider that generates supply sense voltage SEN_VCC. A series of n-channel transistors 120, 121, 122 each have their gate connected to their drain. As the supply voltage Vcc (or Vdd) rises, the voltage SEN_VCC of the gate and drain of n-channel transistor 122 rises in proportion to the Vcc rise. For example, SEN_VCC may be 30% of Vcc over a wide range of supply voltages.

Resistor 92 supplies current to n-channel transistor 94, which has its gate and drain tied together to set a bias voltage VB. This bias VB is applied to the gate of n-channel tail transistor 110, setting a current sink for the differential comparator. Current is sourced by p-channel current-mirror transistors 96, 100, which have their gates connected together and to the drain of transistors 96, 106.

The band-gap reference voltage VREF is applied to the gate of n-channel differential transistor 108, while the supply sense voltage SEN_VCC is applied to the gate of n-channel differential transistor 106. When the supply voltage rises above the limit, SEN_VCC is above VREF. Less current is conducted through differential transistor 108 than through differential transistor 106, causing high supply signal HVDD, the drain of differential transistor 108, to rise.

The rising HVDD is inverted by transistors 104, 112, driving VCC_OK low to indicate that the supply voltage is too high, over the limit. The low VCC_OK then causes ring oscillator 10 to turn off, halting substrate pumping. This prevents the substrate from being pumped in the over-voltage supply condition.

Figure 5:
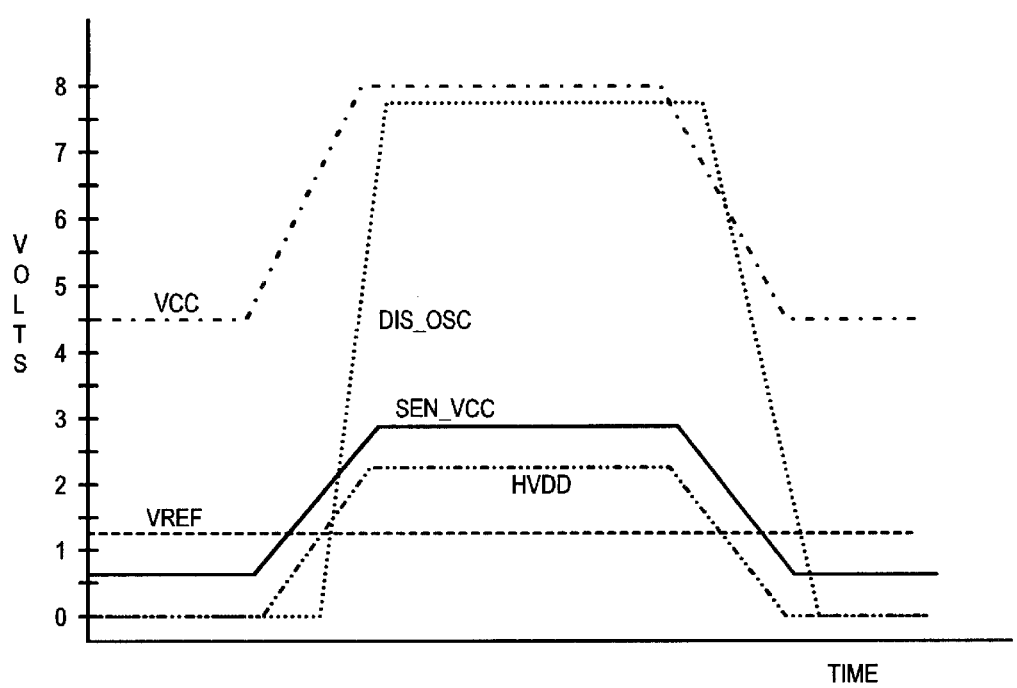
FIG. 5 is a graph showing disabling of the substrate charge pump when the over-voltage supply condition is detected.

FIG. 5 is a graph showing disabling of the substrate charge pump when the over-voltage supply condition is detected. As the supply voltage Vcc rises above its nominal 5 volts to 8 volts, the supply sense voltage divider outputs a rising supply sense voltage SEN_VCC. Once SEN_VCC crosses over the band-gap reference voltage VREF, the differential amplifier changes state, driving HVDD from low to a higher voltage. VCC_OK goes low, causing DIS_OSC to go high. This disables ring oscillator 10, protecting the chip from the over-voltage supply.

In this example, the band-gap reference voltage VREF is 1.3 volts. The relative sizes of n-channel transistors 120, 121, 122 are chosen so than SEN_VCC is less than 1.3 volts when Vcc is at 4.5 volts, but greater than 1.3 volts when Vcc rises above 6 volts.

ALTERNATE EMBODIMENTS

Several other embodiments are contemplated by the inventor. Many different choices for transistor and resistor sizes can be made, and additional inversions, logic gates, transistors, resistors, and capacitors can be added. Of course, other values of the reference voltage VREF could be used, and different supply limits could be substituted. Supply voltages other than 5 volts can be used, such as 3.3 volts or 1.8 volts. The band-gap reference voltage may vary somewhat with conditions such as temperature and process. The substrate may be one or more wells on a deeper substrate, or isolated such as wells on a silicon-on-insulator substrate. Transistors could be reversed between p-channel and n-channel, and a bias above ground or power could be generated for n-type substrates or wells.

The ring oscillator can have different numbers of inverters, and can use other delay elements such as resistors and capacitors. Other types of oscillators can be substituted, and the oscillator can be disabled in a variety of ways, such as by gating an output, forcing an input, breaking the loop with a gate, etc. Signals can be active high, or active low, or tri-state. The charge pump can be constructed in a variety of ways. For example different numbers of diode-connected transistors in series can be employed to achieve different substrate biases. Rather than having two pumps in parallel as shown in FIG. 3, only one pump can be used, or more than two.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A low-power substrate bias generator comprising:
   an oscillator for generating pumping signals when activated, but being in a low-power state when disabled;
   a charge pump, receiving the pumping signals from the oscillator, for pumping charge from a substrate to reduce a substrate voltage to a target;
   a substrate comparator, sensing the substrate voltage and comparing the substrate voltage to a target, for disabling the oscillator when the substrate voltage has reached the target;
   wherein the substrate comparator further comprises:
      a reference-voltage generator for generating a current-reference voltage;
      a current switch, coupled to the reference-voltage generator, for switching a large current through the reference-voltage generator when the substrate comparator is in the higher-power state, but for switching a smaller current through the reference-voltage generator when the substrate comparator is in the lower-power state;
      wherein the reference-voltage generator switches the current-reference voltage between a first level for the higher-power state, and a second level for the lower-power state;
      a sensing transistor, receiving the substrate voltage, for modulating a larger current when the current-reference voltage is at the first level, but for modulating a smaller current when the current-reference voltage is at the second level, the sensing transistor modulating a current in response to changes in the substrate voltage;
      wherein the substrate comparator senses the substrate voltage more quickly when in the higher-power state than when in the lower-power state, and
   a supply comparator, sensing a supply voltage and comparing a supply-independent reference voltage, for disabling the oscillator when the supply voltage is above a limit determined by the supply-independent reference voltage,
   whereby the oscillator is disabled, entering the low-power state, when the substrate reaches the target or when the supply voltage is above the limit and whereby rapid substrate sensing is provided before the substrate voltage reaches the target, but the lower-power state is entered after the target is reached.

2. The low-power substrate bias generator of claim 1 further comprising:
   gating means, receiving a first disable signal from the substrate comparator and a second disable signal from the supply comparator, for generating a third disable signal when either the first or second disable signal is activated to disable the oscillator;
   wherein the oscillator includes disable means for disabling the oscillator from oscillating in response to the third disable signal;
   wherein power is reduced by halting oscillations by the oscillator when the first or second disable signal is activated.

3. The low-power substrate bias generator of claim 2 wherein the substrate comparator enters a lower-power state when the substrate voltage reaches the target, but is in a higher-power state when the substrate voltage has not reached the target,
   whereby power in the substrate comparator is reduced once the substrate voltage reaches the target.

4. The low-power substrate bias generator of claim 1 wherein the sensing transistor comprises a transistor that receives the substrate voltage on a bulk terminal but not on a gate, drain, or source terminal, the sensing transistor modulating the larger or smaller current as a drain-to-source current in response to threshold-voltage changes caused by changes in the substrate voltage,
   whereby bulk sensing of the substrate voltage is used.

5. The low-power substrate bias generator of claim 4 wherein the substrate comparator further comprises:
   a current source transistor, with a gate receiving the current-reference voltage, for generating the larger current when the current-reference voltage is at the first level, but for generating the smaller current when the current-reference voltage is at the second level, the current source transistor outputting the larger or smaller current to a first node;
   wherein the sensing transistor is an n-channel transistor receiving the substrate voltage at a bulk terminal, having a gate and drain coupled together at the first node to receive the larger or smaller current from the current source transistor.

6. The low-power substrate bias generator of claim 5 wherein the substrate comparator further comprises:
   a second current source transistor, with a gate receiving the current-reference voltage, for generating a second larger current when the current-reference voltage is at the first level, but for generating a second smaller current when the current-reference voltage is at the second level, the current source transistor outputting the second larger or smaller current to a second node;
   a reference sensing transistor having a gate and drain coupled together at the second node to receive the second larger or smaller current from the second current source transistor; and
   a differential comparator, receiving the first node and the second node, for comparing voltages of the first node and the second node to generate an output, the output changing when the substrate voltage reaches the target, whereby a voltage of the first node that is modulated by the substrate voltage is compared to a voltage of the second node generated by a reference.

7. The low-power substrate bias generator of claim 6 wherein the reference sensing transistor is a p-channel transistor that is not connected to the substrate voltage while the sensing transistor is a n-channel transistor having a bulk terminal connected to the substrate voltage.

8. The low-power substrate bias generator of claim 7 wherein the differential comparator further comprises:
   a third current source transistor, with a gate receiving the current-reference voltage, for generating a third larger current when the current-reference voltage is at the first level, but for generating a third smaller current when the current-reference voltage is at the second level, the third current source transistor outputting the second larger or smaller current to a third node;
   a first differential transistor with a gate coupled to the first node and a source coupled to the third node; and
   a second differential transistor with a gate coupled to the second node and a source coupled to the third node;
   wherein the third larger current is switched among the first and second differential transistor when the current-reference voltage is at the first level, producing a faster switching of the output, but the third smaller current is switched among the first and second differential transistor when the current-reference voltage is at the second level, producing a slower switching of the output;

wherein comparison is faster when the current-reference voltage is at the first level, but power is reduced when the current-reference voltage is at the second level.

9. The low-power substrate bias generator of claim 8 wherein the first and second differential transistors are p-channel transistors that are not sensitive to the substrate voltage.

10. A power-reducing bias generator comprising:
ring oscillator means for generating an oscillating voltage;
charge pump means, receiving the oscillating voltage through a capacitor, for pumping charge from a pumped node;
supply-voltage comparator means for detecting when a supply voltage is over a limit;
a pumped-voltage detector means for detecting when the pumped node has reached a target voltage;
disable means, coupled to the supply-voltage comparator means and to the pumped-voltage detector means, for disabling the ring oscillator means when the supply-voltage comparator means detects that the supply voltage is over the limit, and for disabling the ring oscillator means when the pumped-voltage detector means detects that the pumped node has reached the target voltage;
wherein the ring oscillator means draws less current when disabled than when generating the oscillating voltage; and
current-switching means, in the pumped-voltage detector means, for switching a detection current from a high current to a low current when the pumped-voltage. detector means determines that the pumped node has reached the target voltage;
wherein the current-switching means comprises:
boost switch means for switching on a boost current to increase a reference current;
voltage-reference means for generating a voltage reference that determines the detection current generated by the current-switching means, the voltage reference being generated in response to the reference current; and
feedback means for driving an output of the pumped-voltage detector means to the boost switch means,
wherein the pumped-voltage detector means draws less current when the current-switching means switches the detection current to the low current when the pumped-voltage detector means determines that the pumped node has reached the target voltage,
whereby power is reduced in both the ring oscillator means and in the pumped-voltage detector means when the pumped node reaches the target voltage and whereby current is switched to increase the detection current.

11. The power-reducing bias generator of claim 10 wherein the pumped-voltage detector means further comprises:
sense transistor means, coupled to the pumped node through a bulk terminal but not through a gate, drain, or source terminal, for generating a sense signal using a portion of the detection current;
reference transistor means, not coupled to the pumped node, for generating a reference signal using a portion of the detection current;
differential compare means, receiving a portion of the detection current, for comparing the sense signal to the reference signal to determine when the pumped node has reached the target voltage.

12. The power-reducing bias generator of claim 11 wherein the supply-voltage comparator means further comprises:
band-gap means for generating a supply-independent voltage that does not depend on the supply voltage;
supply sense means for generating a supply-sense voltage that depends on the supply voltage;
second differential compare means, coupled to the band-gap means and to the supply sense means, for comparing the supply-independent voltage to the supply-sense voltage to determine when the supply voltage is over the limit.

13. A substrate-bias generator comprising:
an oscillator that is disabled and enters a lower-power mode in response to a disable signal;
a charge pump, driven by the oscillator, for generating a substrate bias below a ground;
a substrate comparator that generates a substrate-target signal that causes the disable signal to be activated when the substrate bias reaches a target, the substrate comparator having a high-power mode and a low-power mode wherein the substrate comparator more quickly senses the substrate bias when in the high-power mode than when in the low-power mode; and
a feedback switch, activated by the substrate-target signal, for reducing current in the substrate comparator when the substrate-target signal is active to place the substrate comparator into the low-power mode, but for increasing current in the substrate comparator when the substrate-target signal is inactive to place the substrate comparator into the high-power mode,
whereby current is reduced in both the oscillator and the substrate comparator when the substrate bias reaches the target.

14. The substrate-bias generator of claim 13 wherein the substrate comparator further comprises:
a substrate sensing transistor, having a gate and a drain coupled together at a first sense node, with a substrate driven by the substrate bias, the substrate sensing transistor being an n-channel transistor;
a reference sensing transistor, having a gate and a drain coupled together at a second sense node, the reference sensing transistor being a p-channel transistor that is not connected to the substrate bias;
a differential comparator, receiving the first and second sense nodes as compare inputs, for generating the substrate-target signal in response to a voltage difference between the first and second sense nodes.

15. The substrate-bias generator of claim 14 wherein the substrate comparator further comprises:
a first current-source transistor, having a gate and a drain coupled together at to a source-reference node, for sourcing a reference current to the feedback switch, the reference current having a low-current state when the feedback switch reduces current and a high-current state when the feedback switch increases current;
a second current-source transistor, having a gate driven by the source-reference node, for sourcing a higher current to the differential comparator when the reference current is in the high-current state, but for sourcing a lower current to the differential comparator when the reference current is in the low-current state;

a third current-source transistor, having a gate driven by the source-reference node, for sourcing a higher current to the substrate sensing transistor when the reference current is in the high-current state, but for sourcing a lower current to the substrate sensing transistor when the reference current is in the low-current state; and a fourth current-source transistor, having a gate driven by the source-reference node, for sourcing a higher current to the reference sensing transistor when the reference current is in the high-current state, but for sourcing a lower current to the reference sensing transistor when the reference current is in the low-current state, whereby current sources provide higher and lower currents to the substrate comparator in response to the feedback switch.

16. The substrate-bias generator of claim 15 wherein the differential comparator comprises:

a first p-channel differential transistor that receives the first sense node at a gate, with a drain coupled to a mirror node and a source coupled to receive current from the second current-source transistor;

a first n-channel mirror transistor, having a gate driven by the mirror node, and a drain coupled to the mirror node;

a second p-channel differential transistor that receives the second sense node at a gate, with a drain coupled to an output node and a source coupled to receive current from the second current-source transistor;

a second n-channel mirror transistor, having a gate driven by the mirror node, and a drain coupled to the output node.

17. The substrate-bias generator of claim 16 further comprising:

a power-supply comparator for determining when a power-supply voltage is above a limit set by a band-gap reference, the power-supply comparator activating the disable signal to the oscillator when the power-supply voltage is above the limit, whereby supply over-voltage protection is provided.

18. The substrate-bias generator of claim 17 wherein the feedback switch comprises:

a first resistor coupled between the source-reference node and ground;

a second resistor coupled between the source-reference node and a switched node;

a transistor coupled to switch current from the switched node to the ground, having a gate responsive to the substrate-target signal.

* * * * *